Jan. 27, 1959     G. A. LYON     2,871,062
WHEEL COVER
Original Filed Oct. 12, 1953
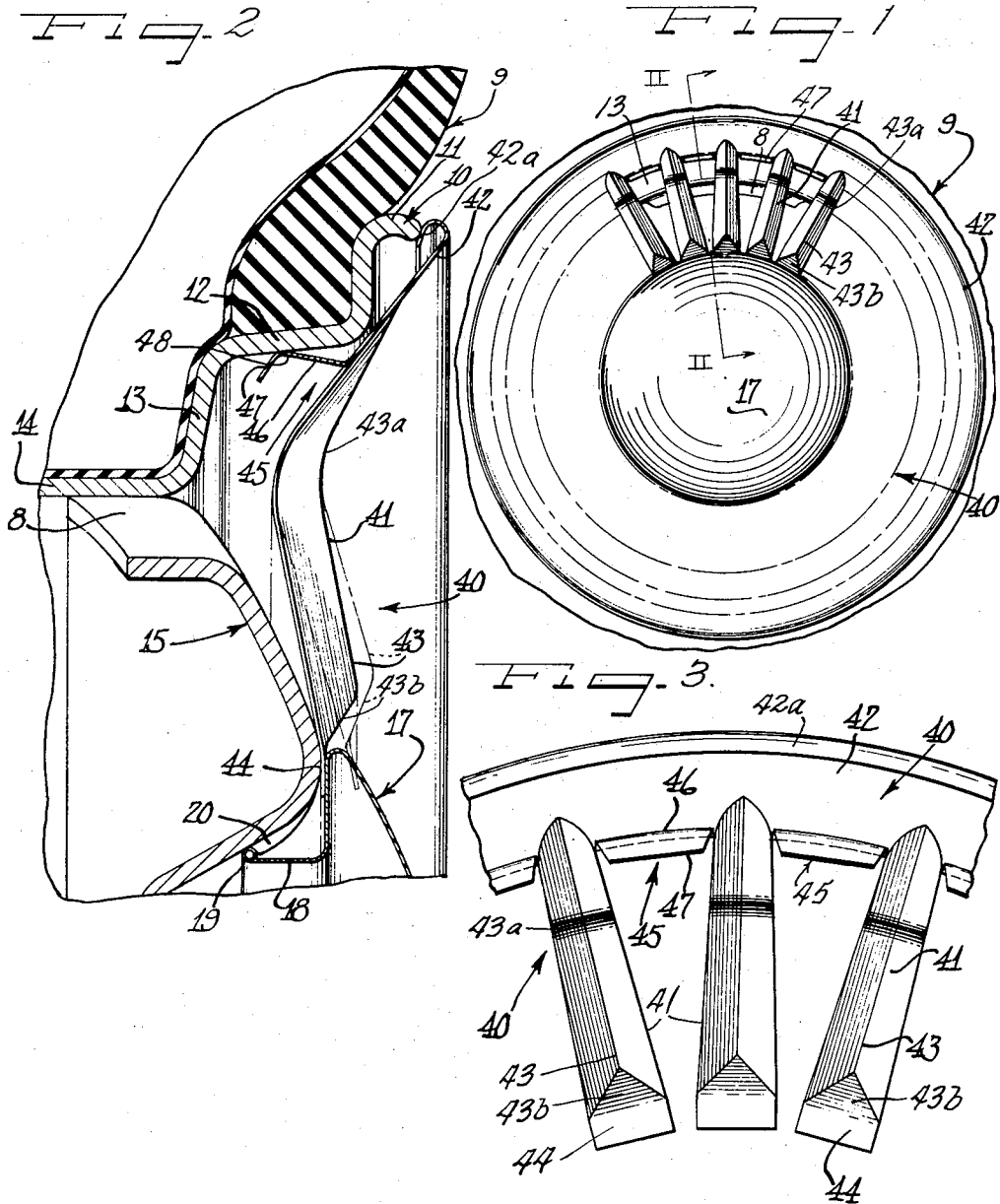
Inventor
George Albert Lyon United States Patent Office 2,871,062
Patented Jan. 27, 1959

2,871,062

WHEEL COVER

George Albert Lyon, Detroit, Mich.

Original application October 12, 1953, Serial No. 385,471, now Patent No. 2,757,976, dated August 7, 1956. Divided and this application May 22, 1956, Serial No. 586,893

9 Claims. (Cl. 301—37)

The present application is a division of my application Serial No. 385,471 filed October 12, 1953, now Patent Number 2,757,976.

This invention relates to a wheel cover and more particularly to a spoked wheel cover for automobile wheels.

An object of this invention is to provide a wheel cover with alternating spokes and retaining fingers which lends itself to economical manufacture on a large production scale.

Another object of this invention is to provide a wheel cover with cover retaining fingers cooperable with a rim flange of the cover and also with resilient spokes clampingly cooperable with the body part of the cover.

A further object of the invention is to provide a wheel assembly including a flanged tire rim and a wheel body that has circumferentially spaced wheel cover retaining means and with a cover for disposition at the outer side of the wheel including a flanged portion that is retainingly engageable with the retaining means on the wheel body and a portion that has resilient means pressed outwardly for engaging a flange of the tire rim for aiding in centering the cover over the wheel.

Still another object of the invention is to provide an improved cover for disposition at the outer side of a vehicle wheel having a flanged tire rim and with the cover including novel centering finger means arranged to be placed under increased retaining engagement with the tire rim incident to completing assembly of the cover with the wheel.

It is also an object of the invention to provide a novel spoked wheel cover.

Other objects, features and advantages of the present invention will be readily apparent from the accompanying drawing in which:

Figure 1 is an outer side elevational view of a wheel structure embodying features of the invention;

Figure 2 is an enlarged fragmentary radial sectional view taken substantially on the line II—II of Figure 1; and Figure 3 is a fragmentary rear elevational view of the radially outer portion of the cover showing the relationship of retaining fingers and spokes.

In the drawing there is shown a conventional type of automobile tire and wheel assembly including a conventional pneumatic tire and tube assembly 9 mounted in the customary way upon a multi-flanged, drop-center type of tire rim 10. The tire rim 10 includes an outer terminal flange 11, a generally axial intermediate flange 12 that slopes slightly radially outwardly, a generally radial side flange 13 that faces generally axially outwardly, and a base flange 14 that faces generally radially inwardly and has attached thereto a supporting body member 15 that provides air circulating wheel openings 8 adjacent juncture with the tire rim.

Carried by the body or load bearing part or member 15 and adapted to provide a radially inner portion of a cover assembly for disposition at the outer side of the wheel is a detachable central hub cap member 17. Attachment of the inner or hub cap cover member 17 to the wheel is effected through the medium of an underturned annular skirt affording an axially rearwardly or inwardly extending annular flange portion 18 having a continuous resilient edge bead 19 at its axially inner terminus adapted to be snapped over spaced bumps or protuberances 20 affording circumferentially spaced wheel cover retaining means through which the hub cap cover member is fastened to the wheel in assembly.

According to the present invention, as a radially outer portion of the cover assembly for overlying the tire rim 10 and the portion of the wheel body 15 radially outwardly from the edge defined by the hub cap inner cover portion 17, there is provided a wheel cover member 40 including generally radially inwardly extending spokes 41 which are circumferentially spaced and at their radially outer termini connected together in one piece in a reinforcing outer annular marginal cover portion 42 provided with an underturned extremity bead-like reinforcing and finishing flange 42a adapted in assembly with the wheel to lie against the tip of the terminal flange 11. From the underturned reinforcing bead flange 42a the outer marginal cover portion 42 extends generally radially and axially inwardly over the inner portion of the terminal flange and into generally telescoped spaced relation to the intermediate flange 12.

Each of the spokes 41 is longitudinally corrugated or reinforced by a peak or rib as shown at 43 which merges to a substantial extent at the radially outer terminus of the rib into the annular body 42 of the cover and beyond the outer ends of the openings defined between the spokes. Each of the spokes 41 is thus similar to an angular rib which has the peak or crest thereof projecting generally axially outwardly and with the channeled inner side of the rib opening generally axially inwardly.

Intermediately each of the rib-like spokes 41 is preferably generally axially inwardly bent or angled substantially dog leg fashion as at 43a. This affords a radially outer generally radially and axially outwardly projecting leg portion and a radially inner generally radially inwardly and axially outwardly directed leg portion, the latter of which is preferably somewhat longer than the radially outer leg portion of the spoke.

At the radially inner end portion of each of the spoke ribs 43, the rib is blunt ended short of the extremity of the rib as at 43b, and a flattened free extremity 44 projects a short distance radially inwardly beyond the flattened shoulder 43b. The flattened extremities 44 project radially inwardly to a diameter which is smaller than the radially outer diametrical extremity of the inner cover member 17 so as to be engageable behind the underturned margin of the cover member 17. Initially the spoke elements 41, and more particularly the radially inner legs thereof extend axially outwardly to a position as indicated in dot dash outline in Fig. 2 wherein after the cover member 40 has been applied to the outer side of the wheel with the reinforced outer marginal bead 42a resting against the terminal flange 11, the inner clamping termini 44 of the spokes are spaced axially outwardly from the wheel body. Then, when the hub cap inner cover member 17 is pushed axially inwardly against the termini 44 in pressing the hub cap into engagement with the retaining bumps 20, the spoke elements 41 are flexed axially inwardly to the full line position wherein the termini 44 are clamped against the wheel body. This places the spoke elements 41 under resilient tension.

Alternating with the spokes 41 are angular cover retaining fingers 45 which extend rearwardly or axially inwardly from the cover 40 and more particularly the radially inner edge defined by the cover portion 42 at the openings between the spoke elements 41. The fingers 45 are in the form of resilient means pressed generally axially inwardly and radially outwardly in the cover 40 from material derived from between the respective spokes 41.

Each of the fingers 45 includes a generally axially inwardly and radially outwardly angled leg 46 and a generally axially inwardly and radially inwardly angled end or terminal flange portion 47 providing at juncture thereof a generally radially outwardly projecting hump shoulder or pad 48 for sliding gripping tensioned frictional engagement with the radially inwardly facing surface of the intermediate tire rim flange 12. A principal function of the fingers 45 is to serve as centering means for the cover member 40. In addition, of course, the fingers 45 do have some cover retaining function due to the frictional engagement with the flange 12 so that in initially applying the cover member 40 to the outer side of the wheel it will be held on with sufficient grip by the centering and retaining fingers 45 so that it will not fall away until the inner cover member 17 has been applied to the center of the wheel and for maintaining the cover member 40 on the wheel through the clamping engagement with the spoke termini 44. Of course, when the cover assembly is entirely on the wheel the appearance is as though a full disk type of cover were on the wheel with the spokes 41 connecting radially inner and outer portions of the cover.

By virtue of the manner in which the rib-spokes 41 merge with the body of the cover portion 42 radially outwardly beyond the juncture of the retaining finger legs 46 with cover portion 42, the axially inward deflectional tensioning of the fairly stiff rib spokes by the hub cap from the dot dash outline position to the full outline position in Fig. 2 imposes a generally radially outward tensioning of the fingers 45 to thereby enhance the retaining grip of the fingers on the rim. In view of the fact that the radially inner leg portions of the spokes 41 are longer than the radially outer leg portions, advantageous leverage is exerted by the inner leg portions upon the outer leg portions and thereby upon the retaining fingers 45 disposed intermediate the outer shorter leg portions of the rib.

In applying the cover to the outer side of the wheel, the cover member 40 is first placed over the wheel with the fingers 45 generally aligned and centered with the axially outer portion of the intermediate flange 12 and then pressing the cover member 40 into the wheel so that the fingers 45 are resiliently stressed as the gripping shoulders 48 thereof are cammed along the inclined surface of the rim flange 12. Thereafter, the hub cap inner cover member 17 is applied over the inner end portions 44 of the spokes to resiliently stress and clamp the same to the body part 15 as the hub cap is snapped into retaining engagement with the wheel carried cover retaining bumps or projections 20.

Removal of the cover assembly is easily effected by first inserting a pry-off tool such as a screwdriver behind the margin of the inner hub cap cover member 17, intermediate the spaced ends of the rib-spokes 41 and ejecting the hub cap member 17. Thereafter the pry-off tool may be inserted behind the outer reinforced edge 42a of the cover member 40 for thereby prying the cover member 40 from the wheel. Of course, when the hub cap member 17 is removed from the wheel, the spokes 41 can spring axially outwardly away from the wheel body 15 and thereby relieve the gripping tension of the retaining fingers 45 so as to facilitate removal of the cover member 40.

It will be appreciated that both portions of the cover assembly, namely the hub cap cover inner member 17 and the outer ring member 40 may be made from suitable sheet metal stamped or drawn to form.

It will be understood that modifications and variations may be effected without departing from the scope of the novel concepts of the present invention.

I claim as my invention:

1. In a wheel assembly including a wheel with a central part having a plurality of circumferentially spaced wheel cover retaining means and a drop center rim having an annular generally radially inwardly facing flange, a wheel cover for disposition at the outer side of the wheel having a resilient rearwardly extending annular flange portion for retaining engagement with said retaining means, and another annular portion spaced radially outwardly from the first named annular flange portion and generally telescoped into said radially facing rim flange, said last named portion having resilient means pressed therefrom and generally radially outwardly therebehind for engaging said rim flange for aiding in centering the cover over the wheel when inserting the cover in place, said resilient means comprising a series of circumferentially spaced generally axially inwardly and radially outwardly angled fingers having generally radially inwardly turned terminals providing at juncture with the fingers generally radially outwardly facing shoulders frictionally grippingly engageable with the rim flange.

2. In a wheel assembly including a wheel with a central part having a plurality of circumferentially spaced wheel cover retaining means and a drop center rim having an annular generally radially inwardly facing flange, a wheel cover for disposition at the outer side of the wheel having a resilient rearwardly extending annular flange portion for retaining engagement with said retaining means, and another annular portion spaced radially outwardly from the first named annular flange portion and generally telescoped into said radially facing rim flange, said last named portion having resilient means pressed therefrom and generally radially outwardly therebehind for engaging said rim flange for aiding in centering the cover over the wheel when inserting the cover in place, said resilient means being disposed radially inwardly from the radially outer extremities of tensioning leverage spokes that project radially inwardly to adjacent said first mentioned rearwardly extending annular flange and are maintained under axially inward leverage tensioning thrust by said engagement with said retaining means by said first mentioned annular flange portion.

3. In a wheel structure including a tire rim and a wheel body, with air circulation openings adjacent juncture of the rim and body, a cover construction for disposition at the outer side of the wheel including a circular inner cover portion engageable retainingly with retaining means on the wheel body and a circular radially outer cover portion for overlying the tire rim and having generally radially extending spokes connecting the cover portions with openings between the spokes for air criculation therethrough and through said wheel openings, said radially outer cover portion having extending generally axially inwardly and radially outwardly therefrom tire rim engaging and centering resilient fingers each of which is provided with a generally radially and axially inwardly extending terminal providing at juncture with the finger a generally radially outwardly facing pad shoulder for resilient frictional gripping of an opposing flange of the tire rim.

4. In a wheel structure including a tire rim and a wheel body, a cover construction for disposition at the outer side of the wheel including a circular radially inner cover portion engageable retainingly with retaining means on the wheel body and a circular radially outer cover portion for overlying the tire rim and having generally radially extending rib spokes connecting the cover portions with openings between the spokes, said radially outer cover portion having extending generally axially inwardly and radially outwardly therefrom adjacent to the radially outer ends of the spokes tire rim engaging and centering resilient fingers each of which is provided with a generally radially and axially inwardly extending terminal providing at juncture with the finger a generally radially outwardly facing pad shoulder for resilient frictional gripping of an opposing flange of the tire rim, said rib spokes being maintained under resilient leverage tension by the engagement of the inner cover portion with the wheel body whereby to exert resilient thrust toward said retaining fingers for enhancing the gripping of the fingers against the tire rim.

5. In a cover for disposition at the outer side of a vehicle wheel, a circular cover member having spaced from a margin thereof generally axially inwardly extending wheel engaging fingers, and projecting from closely adjacent thereto and extending radially therebeyond angular tensioning lever spoke ribs movable generally axially between non-tensioning and tensioning positions wherein said fingers are tensionably urged generally radially for thrusting against an opposing wheel part.

6. In a cover for disposition at the outer side of a vehicle wheel, a circular cover member having spaced from a margin thereof generally axially inwardly extending wheel engaging fingers, and projecting from closely adjacent thereto and extending radially therebeyond angular tensioning lever spoke ribs movable generally axially between non-tensioning and tensioning positions wherein said fingers are tensionably urged generally radially for thrusting against an opposing wheel part, said spoke ribs being of generally dog-leg structure with short legs adjacent said fingers and longer legs projecting therebeyond.

7. In a cover for disposition at the outer side of a vehicle wheel, a circular cover member having a plurality of generally radially extending spoke ribs with free distal end portions for engagement by a second cover member, and wheel engaging fingers on said circular cover member extending from edges of the circular cover member between the adjacent spokes and spaced radially beyond the proximal end portions of the spokes toward the distal end portions.

8. In a cover for disposition at the outer side of a vehicle wheel, a circular cover member having projecting generally radially therefrom a plurality of spoke ribs of transversely hollow rib shape with the distal end portions shouldered off short of the distal ends and with flattened distal end extremities which are engageable behind a clamping cover member.

9. In a vehicle running wheel assembly including a wheel with a central part having a plurality of circumferentially spaced wheel cover retaining means and a drop center rim having an annular generally radially inwardly facing flange, a wheel cover for disposition at the outer side of the wheel having a rearwardly extending annular flange portion for retaining engagement with said retaining means, and another annular portion spaced radially outwardly from the first named annular flange portion and generally telescoped into said radially facing rim flange, said last named portion having resilient tabs pressed from generally axially extending openings therein and extending generally axially in the same direction as the openings from which pressed and directed obliquely generally radially outwardly for engaging said rim flange intermediately thereof for aiding in centering the cover over the wheel when inserting the cover in place and serving as cushioning means to resist road shocks in the travel of the wheel.

References Cited in the file of this patent
UNITED STATES PATENTS

| | | |
|---|---|---|
| D. 167,271 | McLeod | July 15, 1952 |
| 2,368,238 | Lyon | Jan. 30, 1945 |
| 2,504,995 | Lyon | Apr. 25, 1950 |
| 2,557,124 | Lyon | June 19, 1951 |